United States Patent [19]
Noordenbos

[11] 3,714,855
[45] Feb. 6, 1973

[54] PROCESS AND APPARATUS FOR SETTING A FLEXIBLE ELONGATE BODY IN A PARTICULAR FORM

[76] Inventor: Pieter Klaas Noordenbos, Stokhorstpad 1, Enschede, Netherlands

[22] Filed: Feb. 18, 1971

[21] Appl. No.: 116,399

[30]    Foreign Application Priority Data

Feb. 20, 1970    Netherlands ........................7002474

[52] U.S. Cl. ...............................83/1, 83/13, 83/171, 83/542, 83/556, 83/565, 83/699, 83/926 B
[51] Int. Cl. .............................................B26d 3/00
[58] Field of Search........83/1, 16, 13, 171, 542, 556, 83/565, 699, 926 B; 76/101 R; 33/174 G

[56]           References Cited

UNITED STATES PATENTS 3,064,111   11/1962   Newman..............................83/926 B
3,610,078   10/1971   Rowlands....................................83/1

Primary Examiner—Frank T. Yost
Attorney—Stevens, Davis, Miller & Mosher

[57]           ABSTRACT

A process for setting a flexible elongate body, e.g. a wire-shaped body, supported by a number of bearings in a particular flowing form in which the bearings are placed in such relative positions as to cause the body to assume a desired shape, and while the body and the bearings are being positioned relative to each other, they are rotated about their relative geometrical axes. Also an apparatus for carrying out this process is disclosed.

11 Claims, 9 Drawing Figures

PATENTED FEB 6 1973 3,714,855

INVENTOR
PIETER K. NOORDENBOS

BY Stevens, Davis, Miller & Mosher
ATTORNEYS

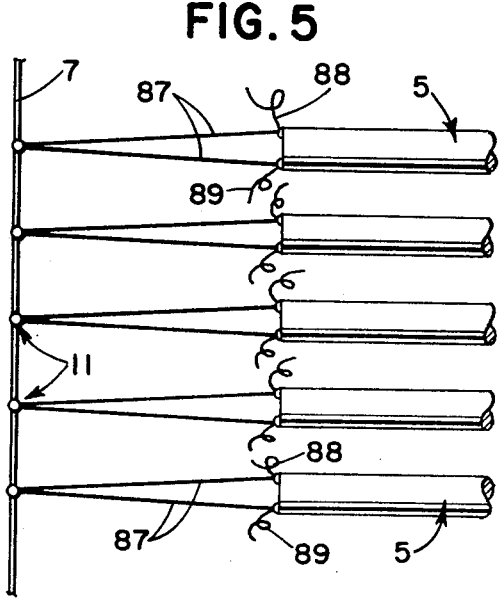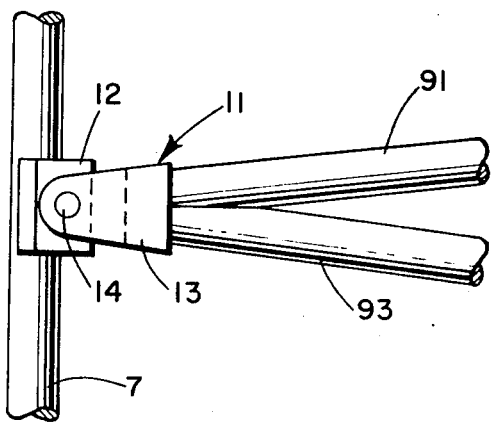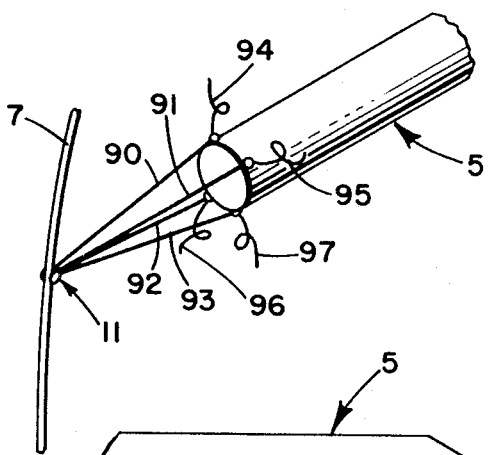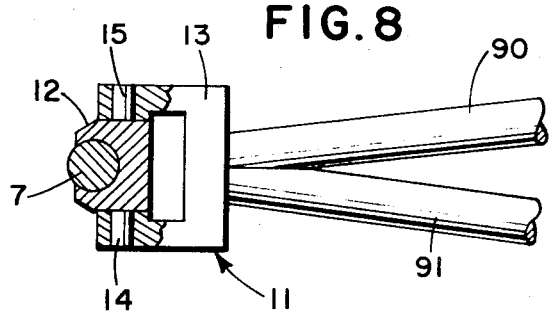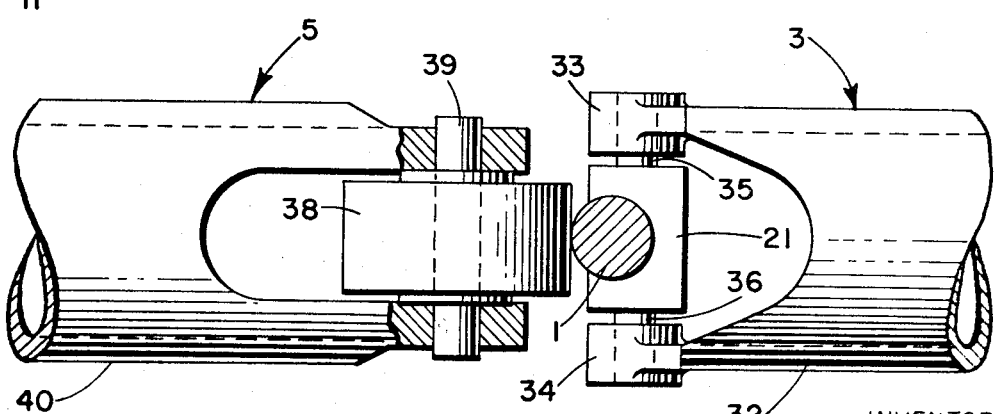
INVENTOR
PIETER K. NOORDENBOS

PROCESS AND APPARATUS FOR SETTING A FLEXIBLE ELONGATE BODY IN A PARTICULAR FORM

This invention relates to a precess and apparatus for setting a flexible elongate body, especially a wire-shaped or rod-shaped body, in a particular form in which the body is supported by a number of bearings that are placed in such relative positions as to permit the body to assume a desired flowing form without any sudden changes in its shape. The term "setting" as used herein refers to giving the body a desired form which is subsequently maintained for a given period of time, or giving the body a form which continuously changes.

In a known precess a wire-shaped cutter cuts through a block of forming material in order that a shaped object may be formed therefrom. In this precess the cutter is supported in bearings whose relative positions define the shape of the cutter and consequently the contours of the object formed. Although the cutter is made of a flexible material, it is not always found to be shaped into the desired flowing form. Moreover, the cutter is subject to sudden changes in shape which are apparently due to the effects of friction at the points where the cutter is supported in the bearings. These changes manifest themselves particularly when the cutter is highly curved. This often occurs in following contours which have a low radius of curvature. As a result, the surface of the workpiece shows irregularities which call for an additional forming treatment.

Advantageously, the process according to the invention overcomes these drawbacks. Thus this invention contemplates a process for setting a flexible elongate body in a particular flowing form, which comprises supporting the flexible body by a number of bearings, placing the bearing in such relative positions that the body is caused to assume a desired shape, and while the body and bearing are being positioned relative to each other, rotating the bearings and the body, respectively, about their relative geometric axes.

This process leads to remarkably favorable results. The wire-shaped or rod-shaped body exactly and rapidly follows rapid and drastic changes in shape while constantly maintaining a flowing form. The relative rotation of the wire-or rod-shaped body and its bearings may be effected by causing only the bearings to rotate or by causing the bearings and the body to rotate at different speeds.

The simplest process in accordance with this invention, however, consists in that only the wire- or rod-shaped body is caused to rotate.

The process can be effected in various ways. In one embodiment of the process of this invention the wire- or rod-shaped body serves as a copying member which is followed by a tracing member. In that case a machine part or element may be caused to describe a path which is defined by the shape of the wire- or rod-shaped body.

In another embodiment the wire- or rod-shaped body serves as a cutting tool by which a shaped object is cut from a block of forming materials, e.g., a thermoplastic mass.

This invention also is directed to an apparatus for setting a flexible wire- or rod-shaped body, supported by a number of bearing, into a flowing form in accordance with a particularly desired curve, the apparatus comprising means for positioning the bearings in such relative positions as to permit the body to be formed along the desired curve.

The apparatus of this invention is further characterized in that body is coupled to a drive for the rotation of the body about its geometrical axis and the bearings are so supported by the positioning means that the bearings are each pivotal about at least one axis transverse to the body.

A very effective embodiment of the apparatus of this invention is characterized in that the drive is formed by a drive motor. The motor may be an electric motor or a pneumatically or hydraulically driven motor.

This invention is also concerned with an embodiment of the apparatus for the production of shaped objects from a block of forming material, e.g., a thermoplastic mass. This apparatus comprises a wire- or rod-shaped body that serves as a cutting tool, a positioning means in the form of plurality of movable followers which carry at one end the bearings supporting the body, and means for effecting relative movement between the block of forming material and the cutting tool.

A preferred embodiment of the apparatus is characterized in that the support bearings are formed by bearing sleeves which embrace the wire- or rod-shaped body only partly. This embodiment is of importance both for the case where the wire- or rod-shaped body serves as a copying member and for the case where it functions as a cutting tool for working a block of forming material. In the first case the tracing can be effected non-interruptedly since the tracing member need not run in contact with the bearings. In the second case the bearing sleeves are each provided with an opening on the side of the workpiece which prevents the bearings from cutting grooves into the workpiece.

In order to facilitate the cutting operation it is recommended that the bearings are supported by a cutter-functioning end of the followers. This is of particular importance if in a single pass much material is to be cut and the ends of the followers penetrate fairly deeply into the workpiece.

It is then preferred that the follower end functioning as cutter is formed by a plurality of cutting wires.

A very suitable embodiment of this apparatus is characterized in that the end functioning as cutter is formed by three or more cutting wires which form the ribs of a three- or more sided pyramid whose vertex is connected to a bearing sleeve and whose base is connected to a follower.

For the cutting of thermoplastic material, the apparatus of this invention is preferably provided with means for heating the cutter ends of the followers as well as the wire-shaped body.

The invention will be further described with reference to its specific embodiments and to the accompanying drawings in which:

FIGS. 1 and 2, respectively, show a schematic plan view and a side elevation of an apparatus for the manufacture of shaped objects;

FIG. 5 shows a support of the cutting wire bearing, which support serves as a cutter;

FIG. 6 shows another embodiment of the support shown in FIG. 5;

FIGS. 7 and 8 illustrate a special embodiment of the cutting wire bearing in side elevation and in cross-section, respectively; and FIG. 9 shows an enlarged detail of the apparatus of the invention.

Figure 1:
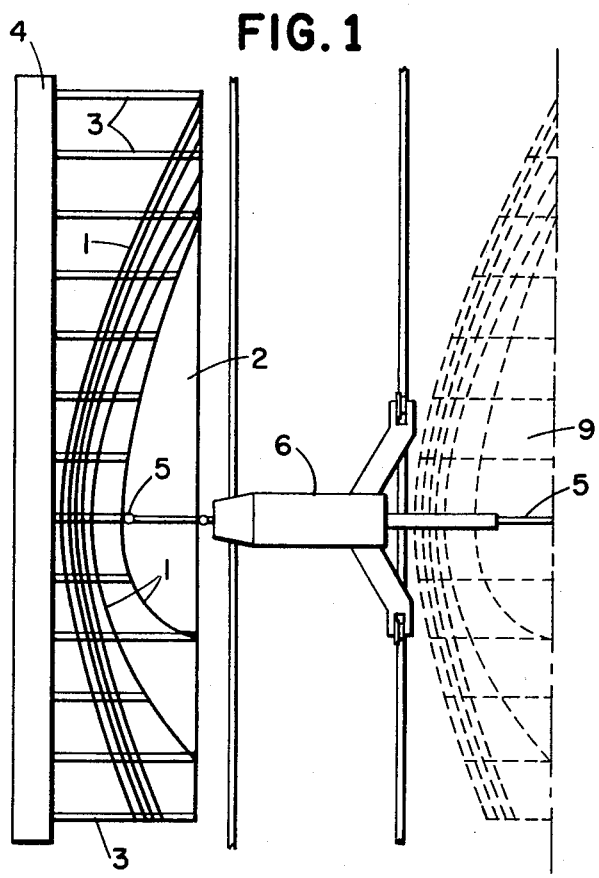
Figure 2:
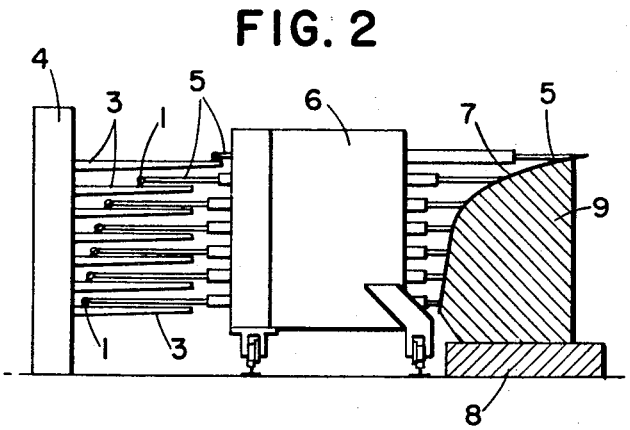

In the apparatus shown in FIGS. 1 and 2 a three-dimensional model 2 has been made with the aid of steel profiles or wire-like bodies 1. The profiles 1 may be bent along the waterlines of a sketch plan for a ship model. The profiles are attached to a holder 4 by means of supports 3. Each of the profiles 1 is traced by a follower 5 which is slidably supported in a follower carriage 6. The follower carriage is moved past the holder 4 and the three-dimensional model 2. During this movement the left ends of the followers 5 are in contact with the profiles 1, while exercising a slight pressure thereon.

The right ends of the followers 5 are so coupled to a flexible and resilient, electrically heated cutting wire 7 that the wire is freely movable in its axial direction.

Mounted on a workpiece table 8 is a block of forming material, for instance of foamed polystyrene 9, which during the movement of the follower carriage 6 is severed by the cutting wire 7. In this way, the workpiece 9 will be given a form which corresponds to that of the three-dimensional model 2.

As already mentioned, the cutting wire 7 in the known apparatus does not always assume the desired flowing form as a result of friction at the supporting points.

Figure 3:
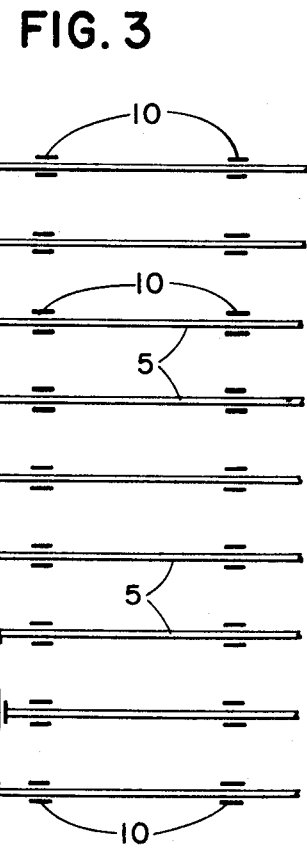
FIG. 3 shows a cutting wire rotatable about its longitudinal axis.

In accordance with this invention the construction of this type of apparatus has now been improved as indicated in FIG. 3. The support of the followers 5 by the carriage 6 (FIGS. 1 and 2) is represented by the bearings 10. Each of the followers have at their left end a pivotal cutting wire bearing 11 which is shown in more detail in FIG. 4. The cutting wire bearing consists of a sleeve 12 having a length which equals about twice the diameter of the cutting wire 7. The bearing sleeve 12 is supported by a fork 13, which is positioned at the end of the follower 5. At the bearing sleeve 12 there are provided two pins 14, 15 which rest in the fork 13. As a result, the bearing sleeve 12 is pivotal about an axis perpendicular to the plane of the cutting wire 7.

Attached to the top follower in FIG. 3 is a small electric motor 16, which is connected to the cutting wire 7. The electric motor 16 can pivot about a shaft 17 perpendicular to the plane of the cutting wire 7. The motor is connected to a source of power (not shown) by means of flexible leads 18.

During operation, when the cutting wire is moving through the forming material, it is rotated by the electric motor. As a result, the cutting wire assumes, without now being subject to shocks, a flowing form, both in the case of a high curvature of the wire and in the case of high friction at the cutting wire bearings.

The wire cutter 7 need not be round, nor is it necessary for it to make a rotation at constant angular velocity in a single direction. It is also contemplated that rotation of the cutter to the left rapidly alternates with rotation to the right. The rotation need not be effected by means of a drive motor. The cutter may also be rotated manually.

Nevertheless, the most favorable results are obtained with a wire cutter which has at least a substantially round cross-section and is rotated by a small electric motor having a constant angular velocity and the same direction of rotation.

In the schematic representation of the embodiment of the invention shown in FIG. 5 the cutting wire bearings 11 are each supported by one end of each of the followers which also functions as a cutter. This end is formed by a V-shaped, bent steel wire 87 about 2 millimeters thick, which is attached to the follower 5 but electrically insulated therefrom. The two ends of the V-shaped steel wire are connected to a current source (not shown) by means of flexible leads 88, 89. As a result, the wire 87 is electrically heated. Both the shape and the heating of the end 87 of the follower contribute to realizing a smooth cutting through a thermoplastic forming material.

FIG. 6 shows an embodiment in which the end of the follower includes four cutting wires 90, 91, 92, and 93. They form the ribs of a four-sided pyramid whose vertex is connected to the cutting wire bearing 11 and whose base is connected to the follower 5. As a result, a rigid construction of the follower end is obtained. The four cutting wires 90 up to and including 93 may consist of four separate steel wires. In the case under present consideration they form the legs 90, 91, and 92, 93 of the two V-shaped, bent steel wires which together are welded to the cutting wire bearing 11. The steel wire 90, 91 is connected to a current source (not shown) by means of leads 94, 95, and the steel wire 92, 93 via leads 96, 97.

Figure 4:
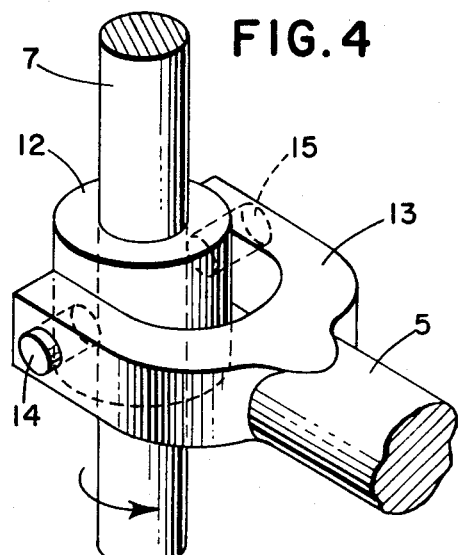
FIG. 4 is a detail of the cutting wire bearing.

FIGS. 7 and 8 show an embodiment of a cutting wire bearing in detail which is somewhat different from the one shown in FIG. 4. Like parts are referred to by like reference numerals. The cutting wire bearing consists of a sleeve 12 which only embraces a portion of the circumference of the cutting wire 7. As a result, part of the cutting wire facing the thermoplastic workpiece projects from the sleeve 12. In this way the bearing sleeves 12 are prevented from making grooves in the surface of the workpiece.

Just as in the embodiment shown in FIG. 4, the sleeve 12 is mounted pivotal in a fork 13. Welded to the fork 13 is the follower end formed by the cutting wires 90, 91, 92, 93, the construction of which is shown in FIG. 6.

FIG. 9 shows in detail how the profiles 1 of the apparatus shown in FIGS. 1 and 2 are attached to the supports. Each support consists of a tube 32 which has a fork-shaped end. Welded to this end are two bearing sleeves 33, 34 which pivotally support the pins 35, 36 of the profile bearing 21. The round profile 1 having a round cross-section is slidable in the profile bearing 21. The profile bearing 21 does not embrace the profile 1 entirely, but leaves part of it free with regard to the tracing of the profile.

Against the free part of the profile rests a roller 38 which rotates on a shaft 39. The shaft 39 is attached to the follower 5, which is formed by a tube 40.

During the movement of the supports 3 the positioning of the profiles 1 serving as copying member is facilitated by rotating the profile and the cutting wire about their geometrical axes. The positioning of the profiles is facilitated even more by their being supported with the aid of pivotal bearings 21 which can pivot about axes perpendicular to the profiles.

It will be appreciated that the process and apparatus according to the invention may be applied in general for the positioning of a wire-shaped or rod-shaped body along a two-dimensional or three-dimensional curve, which may or may not be continuously changing. The body may either serve as a copying member (for instance, in a machine tool for carrying out a cutting operation, a grinding operation, a treatment by spark-erosion, and electrochemical operation) or be used as a forming tool.

The above-described processes and apparatus may serve, for instance, in the design and production of models and molds for:

1. the flow measure (aero- and hydro-dynamics) in ships, aeroplanes, and turbo machines;
2. the manufacture of turbo machines;
3. the production of concrete articles (used in civil engineering); shell roofs, basins, and form blocks;
4. the manufacture of plastic objects reinforced with fiber material;
5. the production of molds, for instance for casting ship's screws;
6. the production of objects from ferrocement (seacrete); these are objects of concrete having a very high proportion of reinforcement; and
7. the manufacture of foamed plastic objects (furniture bodies and their molds, radar domes, radar antennae, sandwich fillings).

What is claimed is:

1. In a process for setting a flexible elongate body in a desired form wherein said body is supported by a number of bearings placed in such relative positions as to cause said body to assume the desired form,
   the improvement which comprises
   rotating said body about its geometrical axis while said bearings are being positioned relative to each other.

2. The process of claim 1 in which the elongate body serves as a copying member which is followed by a tracing member.

3. The process of claim 1 in which the elongate body is a flexible wire that serves as a cutting tool for cutting a shaped object from a block of forming material upon relative movement between the forming material and the tool.

4. An apparatus for setting a flexible elongate body supported by a number of bearings into a flowing form in accordance with a particularly desired curve, said apparatus comprising means of positioning the bearings in such relative positions as to permit said body to be formed along the desired curve, drive means coupled to the body for rotating the body about its geometrical axis and positioning means for supporting the bearings so that the bearings are each pivotal about at least one axis transverse to the body.

5. The apparatus of claim 4, in which the drive means is formed by a drive motor.

6. The apparatus of claim 4, in which said apparatus further includes additional means for producing a shaped object from a block of forming material, said elongate body comprising a wire-shaped body that serves as a cutting tool, said positioning means comprising a plurality of movable followers each of which carry at one end one of the bearings for supporting said body, and said additional means including guide means for causing a relative movement between the block of forming material and the cutting tool.

7. The apparatus of claim 6 in which the bearings are formed by bearing sleeves which only partly embrace the elongate body.

8. The apparatus of claim 6 in which each of said followers have a cutter-functioning end and the bearings are each supported by the cutter-functioning end.

9. The apparatus of claim 8, in which the follower end functioning as cutter is formed by a plurality of cutting wires.

10. The apparatus of claim 9, in which the end functioning as cutter is formed at least three cutting wires which form the ribs of a pyramid having at least three sides, the vertex of the pyramid being connected to a bearing sleeve and the base being connected to a follower.

11. The apparatus of claim 8, characterized in that means are provided for heating the cutter ends of the followers.

* * * * *